C. P. DYER.
NUT LOCK.
APPLICATION FILED AUG. 24, 1906.
913,712.
Patented Mar. 2, 1909.
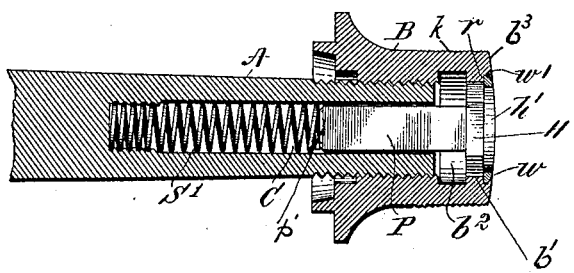
Fig. 1.
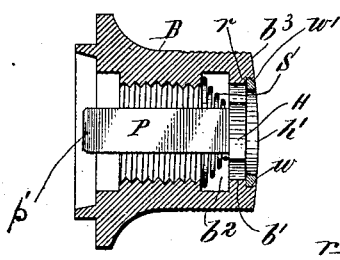
Fig. 3.
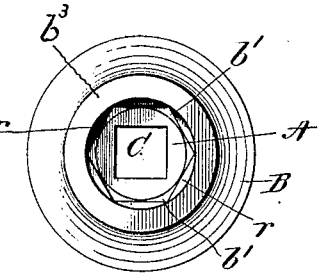
Fig. 2.
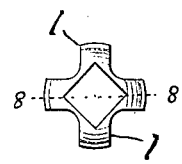
Fig. 7.
Fig. 8.
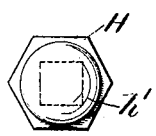
Fig. 4.
Fig. 5.
Fig. 6.
WITNESSES:
Frank G. Parker
John Buckler,
INVENTOR:
Charles P. Dyer

UNITED STATES PATENT OFFICE.

CHARLES P. DYER, OF SOMERVILLE, MASSACHUSETTS, ASSIGNOR TO DYER AXLE LOCK-NUT COMPANY, OF BOSTON, MASSACHUSETTS, A CORPORATION OF MASSACHUSETTS.

NUT-LOCK.

No. 913,712.         Specification of Letters Patent.         Patented March 2, 1909.

Application filed August 24, 1906. Serial No. 331,867.

*To all whom it may concern:*

Be it known that I, CHARLES P. DYER, a citizen of the United States of America, and a resident of Somerville, in the county of Middlesex and Commonwealth of Massachusetts, have invented certain Improvements in Nut-Locks, of which the following is a specification.

The invention relates to nut-locks, more particularly for use in connection with nuts for vehicle-axles or other screw threaded rods, where the wheel turns upon the axle and is held in place by a nut, and is an improvement upon the construction shown and described in my Letters Patent No. 798,996, dated September 5, 1905.

The improvement consists in the peculiarity of construction of the locking plug or key and of the chamber at the outer end of the recessed nut which receives and contains the head of the plug and the location of its controlling spring, as hereinafter described and specified in the claims.

In the accompanying drawings which form a part of this specification, Figure 1 is a longitudinal diametrical section of the end of an axle with the improved nut and locking plug properly assembled therewith; Fig. 2 is a plan of the nut and axle with the plug and its retaining ring or other means removed, looking into the outer end of the nut; Fig. 3 is a longitudinal diametrical section of the improved nut, with a spring within the inner portion of a chamber in the nut, beneath the head of the locking plug; Fig. 4 is an elevation of the outer end of the head of the locking plug; Fig. 5 is a retaining ring or washer for the plug; Fig. 6 is an elevation of a spiral form of spring such as shown within the chamber of the nut in Fig. 3, but removed therefrom, Fig. 7 is a plan and Fig. 8 a sectional elevation on line 8—8, Fig. 7, of another form of spring which may be used in place of the spiral spring shown in Figs. 3 and 6.

Referring to the drawings, A is the end of a screw-threaded axle; B, a recessed nut screwed thereon, C is a longitudinal chamber bored in the end of the axle; as here shown this chamber is rectangular in cross-section, but any other of the known forms which will engage the locking plug or key and prevent it from turning in the chamber, may be used.

P is the locking plug or key, provided with an enlarged head H, of polygonal form, preferably a regular polygon, to facilitate its insertion into a socket or chamber $b'$ of corresponding outline in the outer end of the nut B. Adjacent to the chamber $b'$ within the end of the nut is another chamber $b^2$ of a diameter a little in excess of the greatest diameter of the head H of the plug, so that when that head is pushed from the socket $b'$ into the chamber $b^2$, the nut B may be freely turned about the head of the plug, and the depth of the chamber $b^2$ is made considerably in excess of the thickness of the head H, in order to permit the nut to be screwed further on to the axle when the leather washers become worn, and still leave sufficient space within the chamber $b^2$ to receive the head H when forced inward from the chamber $b'$ and to accommodate the spring $s$ beneath the head. The head H is made larger than the screw-threaded hole in the nut B, so that it cannot pass inward through the nut, and in order to prevent the plug from passing outward through the socket or chamber $b'$, the outer face $b^3$ of the nut B is made crowning, and after the plug P with its head H has been inserted into the nut, its crowning face $b^3$ is forced inward so as to project over the outer edge of the head H and form a lip of metal which will prevent the head from being forced outward from the chamber $b'$ by the spring $s$ which bears against the under side of the head H of the plug P and keeps its head normally within the socket $b'$. Another form of spring which may be used in the chamber $b^2$ beneath the head H, in place of the spiral spring $s$, is the leaf spring shown in Figs. 7 and 8, the plug passing through the hole therein, and its four leaves $l$ will bear upon the inner ledge of the chamber $b^2$. The head of the plug P may also be held in the chamber $b'$ by the spring $s'$ shown in Fig. 1, which spring is secured within the inner end of the chamber C in the axle, as described and claimed in my said Patent No. 798,996; but a spring beneath the head of the plug in the chamber $b^2$ I believe to be an improvement over the arrangement shown in said patent, and better and more convenient for the purpose.

It is found preferable to employ a thin steel ring or washer $w$ which will fit accurately into an annular rabbet $r$ in the outer face of the nut, and project over the outer edge of the head H. Then after this washer is in place in the rabbet r, the outer face of the nut is forced inward over its outer edge, which may be beveled off at w', all as indicated in cross-section in Figs. 1 and 3, and thus the washer will be securely held in its rabbeted seat, and form a more secure and more neatly finished stop for the head H of the plug; also the outer surface of the head H may be turned off at the edge so as to leave a boss or circular projection h' which will accurately fit within and fill the circular space of the ring w, and thus present a substantially even finished surface at the outer end of the nut H. The crowning surface of the outer end of the nut may be forced inward over the edge of the head H or ring w by any of the well-known methods of rolling or other pressure. It will also be found convenient to bevel the inner end of the plug at p', so that it will readily enter the end of the chamber C when the nut is put upon the end of the axle. This construction of plug and nut is cheaper, and it is believed a better means for securing the plug to the nut, so that the plug will not separate from the nut when it is removed from the axle, than that shown in my said prior patent. And also, by placing the spring within the nut beneath the head of the plug P, the expense of tapping a thread in the bottom of the chamber C in the end of the axle for holding the spring s' therein, is avoided, and the entire locking device can be manufactured as a separate article, and the only work to be performed in connection with the axle is to form the chamber or hole in the end thereof to receive the end of the locking plug.

In the drawings, a polygonal head for the plug is shown, but it may be made of oval or any other form which when inserted in a correspondingly shaped socket will prevent the nut from turning about the head, and such I claim as the full equivalent of the polygon. It is preferable to have the head regular in shape and in the form of a polygon of six or eight angles, which permits small adjustments of the nut, that is, fractions of a revolution; while if the head is irregular in shape an adjustment equal to an entire revolution only, can be made.

Although the thread of the nut and axle are cut so that the nut will turn readily and without the use of a wrench, the peripheral surface of the nut near its outer end may be roughened or knurl as at k, Fig. 1, to facilitate such turning, which may be done by the hand.

I claim:

1. In combination with a screw-threaded axle or rod provided with a longitudinal chamber in the end thereof, a plug adapted to slide in said chamber, but held from rotation therein and having a polygonal head of greater diameter than that of the chamber, a recessed axle-nut provided at its outer end with a two-part chamber for the plug-head, the outer part of which chamber is adapted to receive the head and hold the nut from rotation, and the inner part of said chamber to receive the head and permit the nut to turn freely about it, means to retain the plug-head permanently within the two-part chamber, and a spring to hold said head normally in the outer part thereof.

2. A lock for the nut of a screw-threaded axle or rod which has a longitudinal chamber in the end thereof, comprising a plug having an enlarged polygonal head, which plug is adapted to slide longitudinally in the axle-chamber but is held from rotation therein, a recessed axle-nut which is provided with a two-part chamber at its outer end, an outer part to receive and engage the head of the plug, and an inner adjacent concentric part to receive the head and permit the nut to be turned freely about it when the head is pressed inward from the outer chamber, means to prevent the head from passing from the chamber in either direction, and a spring to hold the plug-head normally in the outer chamber.

3. A lock for the nut of a screw-threaded axle or rod having a longitudinal chamber in the end thereof, comprising a locking plug having an enlarged polygonal head, which plug is adapted to slide longitudinally in the axle-chamber, but is provided with means to prevent its rotation therein, a recessed nut for the axle, which nut is provided with a chamber at its outer end to receive the head of the plug and hold said nut from rotation, a concentric annular chamber adjacent to the outer one which will permit the nut to turn freely about said head when it is pressed inward from the outer chamber, a spring to hold the plug-head normally in the outer chamber and means to engage said head and hold it permanently in the nut within the limits of the two chambers.

4. A recessed nut for an axle, a locking plug adapted to engage a chamber in the axle and having an enlarged polygonal head, an outer chamber in the nut-recess adapted to receive the enlarged head of the plug and hold the nut from rotation in relation to the head, a concentric chamber adjacent to the outer chamber which will contain the plug-head when it is pressed inward from the outer chamber, and will permit the nut to turn freely about said head, a spring to hold the plug-head normally in the outer chamber, and means to engage said head and prevent it from passing outward through that chamber or inward through the concentric chamber when the nut is removed from the axle.

5. A recessed nut for an axle, a locking plug adapted to engage a chamber in the axle and having an enlarged polygonal head, an outer chamber in the nut recess adapted to receive the enlarged head of the plug and hold the nut from rotation in relation thereto, a concentric chamber adjacent to the outer chamber which will contain the plug-head when it is pressed inward from the outer chamber and which will permit the nut to turn freely about said head, a spring within the inner chamber of the nut beneath the plug-head to hold it normally in the outer chamber, and means to engage said head and prevent it from passing outward through the outer chamber.

6. A recessed nut for an axle, having permanently combined within itself, a plug, one end of which is adapted to enter and be held against rotation in a chamber in the axle, an outer chamber in the nut to receive and engage the other end of the plug and hold the nut from rotation in relation thereto, a concentric chamber adjacent to the said outer chamber, which is adapted to contain the outer end of the plug when it is pressed inward and permit the nut to turn freely about the plug, a spring within the adjacent chamber, means to effect engagement between the plug and spring to cause the latter to hold the end of the plug normally in the outer chamber and means to prevent the plug from passing outward therefrom.

CHARLES P. DYER.

Witnesses:
 REUBEN L. ROBERTS,
 FLORENCE A. COLLINS.